United States Patent [19]

Larson

[11] Patent Number: 4,528,230
[45] Date of Patent: Jul. 9, 1985

[54] EMERGENCY REPAIR TAPE

[76] Inventor: Donald A. Larson, 8203 Maple Ridge Rd., Bethesda, Md. 20814

[21] Appl. No.: 452,443

[22] Filed: Dec. 23, 1982

[51] Int. Cl.³ ............................................. B32B 3/10
[52] U.S. Cl. .................................... 428/137; 428/131; 428/155; 428/156; 428/192; 428/343; 428/344; 428/354; 428/457
[58] Field of Search ............... 428/131, 136, 137, 138, 428/155, 156, 344, 343, 354, 457, 192

[56] References Cited

U.S. PATENT DOCUMENTS

| | | | |
|---|---|---|---|
| 2,106,133 | 1/1938 | Goldman | 428/344 |
| 2,566,794 | 9/1951 | Debing | 428/344 |
| 3,825,463 | 4/1973 | Amann | 428/137 |

OTHER PUBLICATIONS

Metal Repair Tape-Cat. No. 201-3M Co.

*Primary Examiner*—James J. Bell
*Attorney, Agent, or Firm*—Don E. Ferrell

[57] ABSTRACT

Thin malleable metal foil is packaged in tape rolls or single sheets and is used to repair worn metal parts, such as rotatable shafts, surfaces subject to wear from lateral motion, and rusted or corroded sheet metal. The tape may also be used as a strapping tape to hold broken machinery parts together until a replacement part is obtained. The tape is designed to be temporary in nature, thus to serve as a means for effecting an emergency repair until a more permanent solution can be obtained. The tape may be selectively tapered along its width when it is used to repair a worn portion of a rotatable shaft, since the tapering will permit the tape to conform to a concavely-shaped worn surface in an even manner. To facilitate the degree of tapering, the tape surface may be provided with angulated scribe lines so as to permit a user to cut the desired taper depending upon the concaveness of the worn surface to be repaired. The tape may be perforated to facilitate lubricant retention and cooling; for even further lubrication, the tape may be impregnated with graphite or some similar lubricant. Additional features of the tape may include a gradual thickening of the tape along its longitudinal length so as to provide a stronger and more wear-resistant surface on that portion of the tape which will perform a direct load-bearing function. Additionally, the material from which the tape is made may be gradually increased in hardness along its longitudinal length so as to perform the same function. Also, the tape may be made of fine woven wires, for greater tensile strength and flexibility.

10 Claims, 10 Drawing Figures

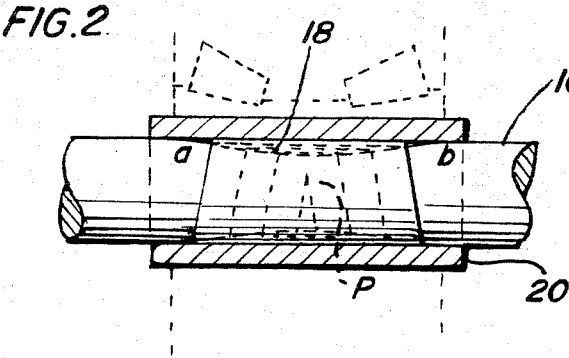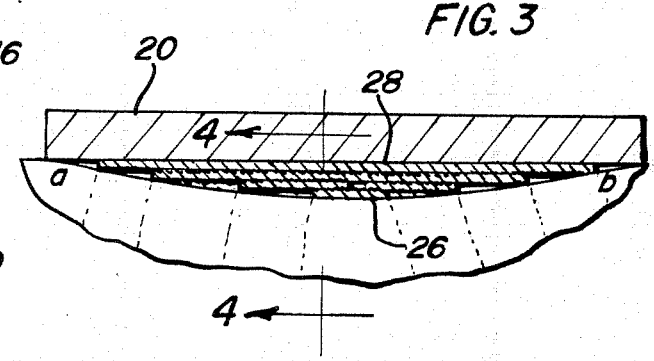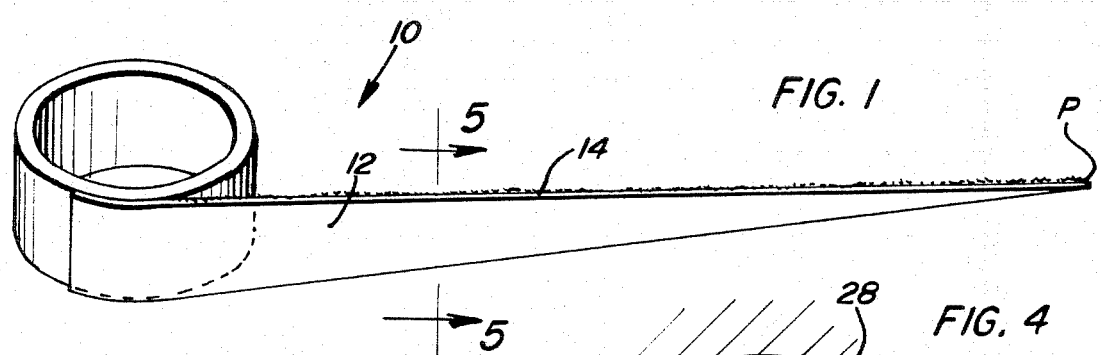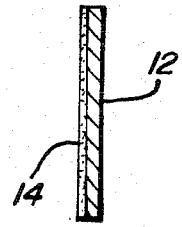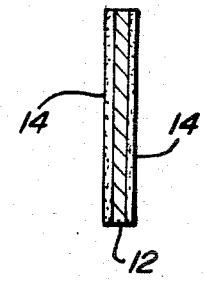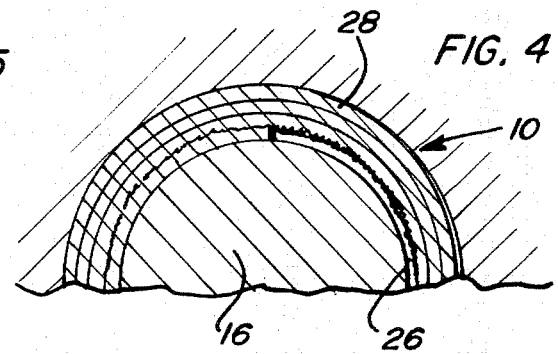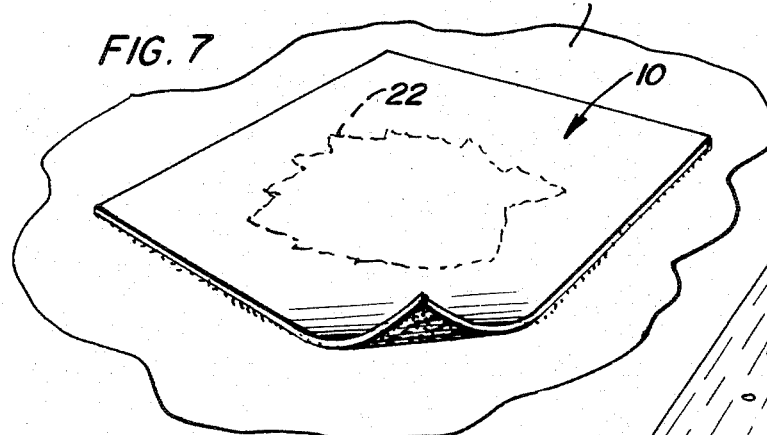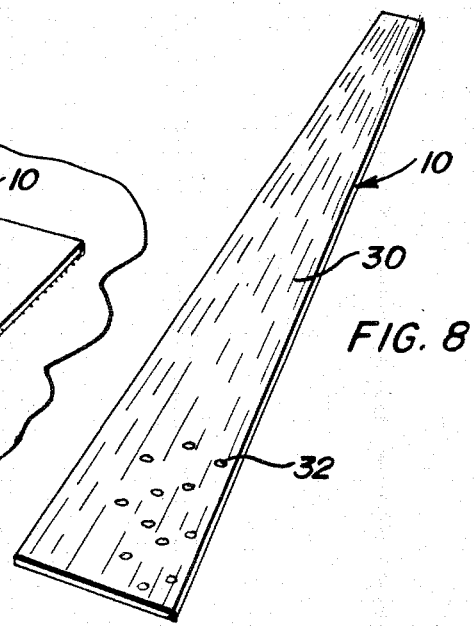

EMERGENCY REPAIR TAPE

BACKGROUND OF THE INVENTION

1. Field of the Invention

The present invention relates to new and useful improvements in devices for and methods of making emergency repairs to worn metal parts, and specifically pertains to a new and improved emergency repair means utilizing thin malleable metal foil provided on tape-like rolls or flat sheets and having an adhesive backing for effecting emergency attachment to worn metal parts, thereby temporarily reconstituting worn metal surfaces.

2. Description of the Prior Art

As can be appreciated, there exist many different techniques for repairing worn metal parts, such as the worn surfaces on rotatable shafts, metallic surfaces subject to wear from lateral motion, and rusted or corroded sheet metal.

With respect to worn rotatable shafts, it is well-known in the art to "rework" the shaffts by the deposition of metallic layers over the worn surfaces, such as by heat or electrically operated processes, and the subsequent machining of the deposited metal layers to achieve a new and smooth operable surface. As is apparent, these processes are effective in achieving their desired result, but usually they require the disablement and disassembly of the associated machinery so that the shafts can be removed therefrom and delivered to a location where the repair processes can be performed. Of course, these processes are not available to effect "on site" emergency repairs, and thus, once a worn surface on a rotatable shaft causes a machine to malfunction, the machine will normally be inoperable until such time as the shaft is removed, repaired and replaced.

By the same token, metallic surfaces subject to wear from lateral motion, and rusted or corroded sheet metal, may similarly require extensive disassembly, removal and transportation to a repair facility which specializes in repairs of a permanent nature. As such, often the equipment with which these metallic members are associated must also be shut down for a considerable period of time until permanent repairs have been effected. A variant of this tape, woven from fine metal wires, would provide extra tensile strength and flexibility, making an ideal strapping tape for binding together broken castings, housings, etc, until a replacement part is obtained.

While there are numerous repair kits that may be transported to the location of disabled machinery having worn or corroded metallic parts, most of these portable repair kits employ the use of materials which in and of themselves are not suitable to effect emergency repairs. For example, there are emergency repair kits available which rely upon fiberglass materials and which will suffice to repair at least rusted or corroded sheet metal surfaces. However, if these surfaces are exposed to excessive heat or if they serve a load bearing function, i.e., the surfaces of other materials will continually bear against or slide over the repaired surfaces, fiberglass is not sufficient to effect the repair. Further, fiberglass requires a substantial "drying" time so as to not be actually suitable for an emergency repair function; additionally, if the associated environmental temperatures around the repair location are too extreme, i.e., either too cold or too hot, the fiberglass becomes almost impossible to work with and may fail to harden.

Accordingly, it can be appreciated that there exists a continuing need for emergency repair kits which are particularly adapted for use with worn metal parts, such as rotatable shafts and the like, and which, upon application, will permit the continued use of the associated machinery or other structure until a more permanent repair can be effected. In this respect, the present invention substantially fulfills this need.

SUMMARY OF THE INVENTION

The general purpose of the present invention, which will be described subsequently in greater detail, is to provide a new and improved means for effecting rapid emergency repairs to worn metal parts, which has all of the advantages of the prior art emergency repair devices and methods and none of the disadvantages. To attain this, the present invention envisions the use of rolls of thin malleable metal foil tape which can be selectively and rapidly applied to worn metal parts, such as may be found on rotatable shafts, surfaces subject to wear from lateral motion, and rusted or corroded sheet metal. More particularly, the invention comprises a foil tape roll similar to a roll of masking tape, which is provided with a strong non-drying adhesive on one or both sides thereof. The width of the tape on the rolls is variable from that of a string to sheets at least a foot or more wide, while the malleability, thickness and hardness would also be variable, depending upon the intended use. Further, the rolls of tape could be tapered in width along a longitudinal length thereof so as to smoothly and evenly accomodate tapered wear on a shaft as will be subsequently described. If desired, a single roll of tape could include a plurality of tapered sections of tape serially wound thereabout, while an exterior surface of the tape could be provided with scribe lines to facilitate the cutting of a specific desired taper, depending upon the determination of the desired taper in relation to the specific concavity or tapering of a worn surface.

Additionally, the tape may be provided with a plurality of perforations to facilitate lubricant retention and cooling, and the tape might also be graphite-impregnated to facilitate its lubrication properties. A further aspect of the invention involves a varying in thickness or hardness of the tape layer so as to provide for a harder and more wear-resistant surface on the final layer of tape.

It is therefore an object of the present invention to provide new and improved worn metal emergency repair methods that have all of the advantages of the prior art emergency repair methods and none of the disadvantages.

It is another object of the present invention to provide new and improved worn metal emergency repair means which may be easily and efficiently manufactured and marketed.

It is a further object of the present invention to provide new and improved worn metal emergency repair means which may be efficiently and reliably used.

Even another object of the present invention is to provide new and improved worn metal emergency repair means which are of a durable and rugged construction.

Still another object of the present invention is to provide new and improved worn metal emergency repair means which facilitate rapid emergency repairs to rotatable shafts, castings, housings, and the like.

Yet another object of the present invention is to provide new and improved worn metal emergency repair means which are characterized by a portable and lightweight construction, thereby to further facilitate transportation, storage and use.

An even further object of the present invention is to provide new and improved worn metal emergency repair means that are susceptible of a low cost of manufacture with regard to both materials and labor, and which accordingly are then susceptible of low prices of sale to the consuming public, thereby making such constructions economically available to the buying public.

Still yet another object of the present invention is to provide new and improved worn metal emergency repair means which provide in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attaind by its uses, reference should be had to the accompanying drawings and descriptive matter in which there is illustrated preferred embodiments of the invention.

BRIEF DESCRIPTION OF THE DRAWINGS

FIG. 1 is a perspective view of a roll of emergency repair tape forming the present invention, such view particularly illustrating the tapering thereof.

FIG. 2 is a plan view, partly in cross-section, illustrating a use of the emergency repair tape forming the present invention on a worn axle.

FIG. 3 is an enlarged detail view, partly in cross-section, more particularly illustrating the manner of use of the present invention as shown in FIG. 2.

FIG. 4 is a cross-sectional view taken along the line 4—4 in FIG. 3.

FIG. 5 is a cross-sectional view taken along the line 5—5 in FIG. 1.

FIG. 6 is a cross-sectional view of a modified form of the emergency repair tape forming the present invention.

FIG. 7 is a perspective view illustrating a manner of application of the present invention to a flat metallic surface.

FIG. 8 is a perspective view of the present invention wherein angulated scribe lines are illustrated on an exposed surface of the repair tape forming the present invention, whereby selective cutting of the tape to a desired width and taper may be achieved.

DESCRIPTION OF THE PREFERRED EMBODIMENTS

Figure 9:
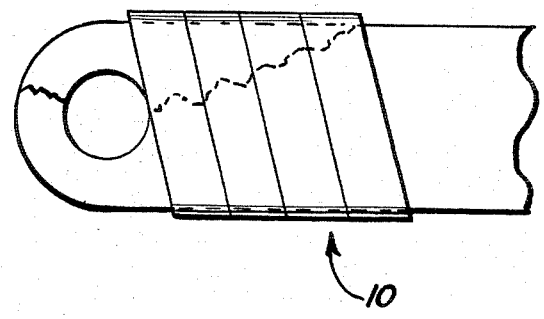
FIG. 9 is a frontal view of a broken casting repaired with emergency foil strapping tape.

With reference now to the drawings, and in particular to FIG. 1 thereof, a new and improved emergency repair tape embodying the principles and concepts of the present invention and generally designated by the reference numeral 10, will be described.

More specifically, it can be seen that in this particular embodiment of the invention, the tape 10 may include an outer load bearing portion 12, which is preferably formed from a thin malleable metal foil similar to an old-fashioned toothpaste tube, while an adhesive layer 14 may be attached to one planar surface thereof to facilitate the rapid attachment of the tape to another surface. The adhesive 14 could be any conventional and commercially available adhesive which provides a strong, heat-resistant bond and which is substantially non-drying until the time of actual use. If desired, a backing could be applied to the adhesive, such as a peel-off material, to protect the same prior to use.

Recognizing the fact that the primary use of the emergency repair tape 10 forming the present invention would be to wrap the same around worn metal shafts to restore them to their original diameter and eliminate "play", the tape would normally serve as a temporary expedient only. Of course, the tape could be utilized on shafts made of materials other than metal, although it is envisioned that the tape itself would in most cases be constructed from the aforementioned metal foil. Viewing FIGS. 2 and 3 concurrently with FIG. 1, it can be appreciated that a shaft 16 is subject to frictional wear which frequently results in a concavely-shaped worn portion 18, rather than an evenly-dimensioned, smooth worn surface. As such, while it is envisioned that the tape 10 forming the present invention could be of a constant width over its entire longitudinal length, one of the novel features of the invention involves a tapering of the tape to point P along a longitudinal length, as best shown in FIG. 1, so as to effectively accommodate the type of worn surface 18 as shown in FIGS. 2 and 3.

More particularly, as shown in FIG. 2, where a shaft 16 has a worn surface 18 which should normally be in contact with a close fitting member 20, such as a bearing race, wheel hub, or the like, there is some necessity for achieving a smooth wrap of the emergency repair tape 10 about the concavely-shaped worn surface 18 and/or the inner surface of member 20 to effect the most secure fit possible between the shaft 16 and the member. As can be appreciated, if the tape were of a constant width along its longitudinal length, a wrapping thereof about the concavely-shaped worn surface 18 would create a plurality of uneven overlays due to the irregular surface of the shaft. To offset this problem, reference is made to FIGS. 1 and 3, where it can be seen that through the use of a tapered length of tape beginning at point P, a final smooth surface of repair tape can be provided for abutment against the member 20. As shown, the gradual increase in width of the tape 10 over its longitudinal length allows a most narrow portion of the tape to lie in the deepest part of a worn surface, while the gradual increase in width then accommodates the increasing width of the worn surface, thereby to substantially reduce the number of overlays required to provide a final finished wrapped repair. As shown in both FIGS. 3 and 4 then, the tapered construction of the tape 10 permits an expeditious means of rebuilding a worn shaft 16 to its original smooth outside diameter, until such time as a more permanent repair or replacement can be achieved.

With respect to the aforementioned adhesive 14, it can be seen with reference to FIG. 5 that the same would normally be positioned along one flat planar surface of the tape 12. However, as shown in FIG. 6, it is not beyond the scope of this invention to have the adhesive 14 positioned on both opposed planar surfaces of the tape 12 so as to further increase the bonding properties of the tape. This particular adhesive arrangement might be best suited to the type of adhesive which is activated by the application of heat, such as by a blow torch or some other means, to effect the desired bonding. Further, a heat-actuated adhesive, of the type that responds to an initial application of heat to effect a gelled bonding regardless of a continuous application of heat, would be particularly useful as a repair means utilizable on rotatable shafts and other surfaces subject to excessive heat. In this respect, the application of heat would effect a further bonding with regard to those portions of the tape adhesive 14 not activated by an initial application of heat during the emergency repair process.

FIG. 7 has been provided for the purpose of illustrating a use of the tape 10, which of course need not be tapered in any particular direction, to effect an emergency repair over the worn portion 22 of a sheet 24 of some material, such as metal or the like. In this respect, the tape 10 could be used for sheet metal patches on automobile bodies, eavespouts, metal roofing, and the like. On automobile bodies, it could be used as either a temporary patch, or a template or contoured form over which fiberglass could be molded and then hardened. The template could be left in place permanently, as the fiberglass would extend beyond the edges thereof onto the repaired surface. This would, of course, require the use of wider sheets of heavier gauge adhesive-coated foil tape 10 and, as mentioned, special contour shaping could be employed depending upon the type of surface on which the tape would be used.

Referencing FIG. 3 again, a further aspect of the invention can be described with reference thereto. More specifically, as shown, the tape 10 may have its end portion 26, which may be of a tapered or non-tapered form, constructed of a lesser thickness than a later portion 28 thereof. In this respect, the tape 10 may be so constructed as to become either gradually thicker or thinner along its longitudinal length so as to accommodate certain needs of a user. Where the tape is of a thicker construction along its longitudinal length, as shown in FIG. 3 (enlarged section a-b in FIG. 2), the thicker surface portion 28 provides a more sturdy load-bearing surface for contact with the member 20, while the thinner portion 26 permits more flexibility in attaching and positioning the tape during the initial wrapping about the shaft 16. Further, either with or without the gradual thickening of the tape along its longitudinal length, it might be desirable to have the portion 28 of the tape constructed of a harder and more wear-resistant material than the portion 26, again to stiffen the load-bearing portion of the tape while retaining the flexibility and ease of use of the portion 26 of the tape which is not in a direct load-bearing relationship to the member 20.

Further novel features of the invention are illustrated in FIG. 8. For example, the tape 10 may have scribed on one or both surfaces thereof, a plurality of lines 30 which will permit a user to cut therealong so as to achieve a desired taper. More specifically, it is possible to determine in advance the amount of taper required to repair a concavely-shaped worn surface 18, as shown in FIG. 2, and rather than provide a multitude of pre-dimensioned rolls of tape, to fit every contingency, a user may, by calculating the depth and width of a worn surface, determine the amount of desired taper needed on the tape 10 to facilitate the proper repair. Accordingly, by cutting along the appropriate scribed lines 30, the desired amount of taper can be achieved prior to an installation of the tape 10 about the worn surface 18.

Also shown in FIG. 8 is the use of perforations 32 extending either partially or completely through the tape 10, such perforations serving to facilitate heat transfer through the tape during installation, provided that a heat-actuated adhesive is used and, further facilitates heat transfer away from the tape once the same has been operably installed and is in use. Further, the perforations 32 permit the flow-through of certain types of adhesive 14, such as paint-on adhesives and additionally, various lubricants may be impregnated within the perforations 32 if desired, so as to improve the lubricity of the repaired surface, where appropriate. In this respect, in lieu of the perforations 32, the tape 10 itself may be impregnated with a particular type of lubricant, such as graphite, so as to provide lubricity in certain use applications.

Figure 10:
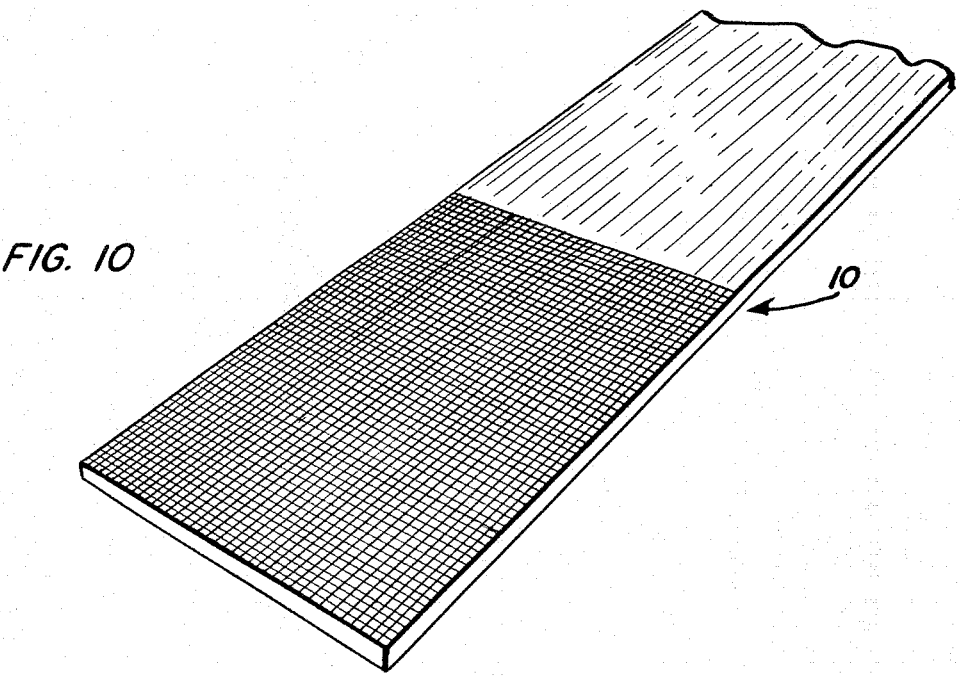
FIG. 10 is a perspective view of a woven variant of the emergency repair tape. It is constructed of fine woven wires.

Additionally, the emergency repair tape could be used as a strapping tape to repair broken castings, housing, etc. as shown in FIG. 9. For such use, a particularly strong, flexible tape could be formed from woven fine metal wires of high tensile strength, as shown in FIG. 10.

In actual use then, it can be appreciated that a user can effectively repair any worn surface, such as the concavely-shaped worn surface 18 on an axle 16, simply by determining the amount of taper required of the tape 10 and then, by cutting along appropriate scribed lines 30, achieve the correct taper before applying the tape about the worn surface 18 as shown in FIG. 3. The repair would, in most cases, be a temporary expedient, and presumably would be most applicable to moderate speed, moderate precision machinery, such as is used in farming, gardening and lawn care. Harvest machinery would be a prime candidate, where sand is a chronic problem in most moving parts and causes wear and breakdowns. "Quick fixes" are constantly in demand, and this product would be "made to order" for such needs. As discussed above, the width of the tape 10 could vary all the way from that of store string to sheets at least a foot wide or more, while its malleability, thickness and hardness could also vary, depending on its intended use. As discussed, the rolls of tape could be made tapered, beginning with a point, and widening out to one or two inches or more, in a given length, to thereby smoothly accommodate tapered wear on a shaft or some similar surface. Specifically tapered sections could be serially repeated on a plastic ribbon to fill a spool or roll, while dimensioned spools of tape could then be stocked in hardware stores in the manner of nuts, bolts and other repair parts.

The emergency repair tape 10 would also seem to be ideal for repairing worn shafts on hand-pushed garden and lawn equipment, as well as on children's toys such as coaster wagons, scooters, and push toys. Additionally, worn window cranks, door knob shafts, and many other household fittings are candidates for repair. Wide tape rolls or sheets could also be used to make corrosion-resistant surfaces in battery overhauling shops and chemical stockrooms, much as shelf paper is used in kitchens. It could also conceivably be used as shielding from radiation or magnetic fields, where lead or ferrous alloys are respectively used.

With respect to the above description then, it should be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An emergency repair tape for repairing worn metal parts, such as rotating shafts, surfaces subject to wear from lateral motion, and rusted or corroded sheet metal, said repair tape comprising:
   metallic foil means for positioning over said worn metal parts;
   wear resistance means for improving the durability and wear resistance of said metallic foil means, said wear resistance means being incorporated into a construction of said metallic foil means, said wear resistance means including impregnating said tape with a lubricant so as to improve lubricity between said tape and abutting surfaces; and
   adhesive means operably secured to said metallic foil means for effecting an attachment of said metallic foil means to said worn metal parts.

2. The emergency repair tape as described in claim 1, wherein said metallic foil means is provided with taper means to facilitate a varying in width of said foil means along longitudinal lengths thereof.

3. The emergency repair tape as described in claim 2, wherein said taper means comprises scribe lines on one planar surface of said foil means, said scribe lines serving as guide means along which cuts may be made to facilitate a proper desired degree of taper.

4. The emergency repair tape as described in claim 2, wherein said taper means comprises a providing of said foil means with variable widths along longitudinal lengths thereof so as to facilitate a repairing of rotatable shafts and the like.

5. An emergency repair tape for repairing worn metal parts, such as rotating shafts, surfaces subject to wear from lateral motion, and rusted or corroded sheet metal, said repair tape comprising:
   metallic foil means for positioning over said worn metal parts;
   wear resistance means for improving the durability and wear resistance of said metallic foil means, said wear resistance means being incorporated into a construction of said metallic foil means, said wear resistance means including perforations along a length thereof so as to improve lubricity and heat transfer properties, said perforations being utilized for retaining lubricant therein; and
   adhesive means operably secured to said metallic foil means for effecting an attachment of said metallic foil means to said worn metal parts.

6. The emergency repair tape as described in claim 5, wherein said wear resistance means further includes varying a thickness of said metallic foil means along a longitudinal length thereof, a thicker portion of said foil means being designed for contacting an abutting surface so as to improve wear resistance properties.

7. The emergency repair tape as described in claim 5, wherein said wear resistance means further includes varying a hardness of said metallic foil means along a longitudinal length thereof, a harder portion of said foil means being designed for abutment with an adjoining member so as to improve wear resistance properties.

8. The emergency repair tape as described in claim 5, wherein said perforations extend completely through a thickness portion of said foil means.

9. The emergency repair tape as described in claim 5, wherein said perforations extend only partially through a thickness portion of said foil means.

10. The emergency repair tape as described in claim 5, wherein said perforations further permit a flow-through of adhesive during an installation process of said foil means to a worn metal surface.

* * * * *